(12) United States Patent
Jedlicka (10) Patent No.: US 12,507,640 B1
(45) Date of Patent: Dec. 30, 2025

(54) TOWER CONTROL BOX WITH MISALIGNMENT INDICATOR LIGHT AND AUTOMATICALLY RESETTING OVERRIDE SWITCH

(71) Applicant: Kurt Jedlicka, Columbus, NE (US)

(72) Inventor: Kurt Jedlicka, Columbus, NE (US)

( * ) Notice: Subject to any disclaimer, the term of this patent is extended or adjusted under 35 U.S.C. 154(b) by 618 days.

(21) Appl. No.: 17/844,561

(22) Filed: Jun. 20, 2022

Related U.S. Application Data (60) Provisional application No. 63/212,783, filed on Jun. 21, 2021.

(51) Int. Cl.
*A01G 25/00* (2006.01)

(52) U.S. Cl.
CPC .................. *A01G 25/00* (2013.01)

(58) Field of Classification Search
CPC ........................................ A01G 25/00
See application file for complete search history.

(56) References Cited

U.S. PATENT DOCUMENTS

| | | | |
|---|---|---|---|
| 4,580,731 A * | 4/1986 | Kegel | A01G 25/092 239/731 |
| 5,927,603 A | 7/1999 | McNabb | |
| 6,755,362 B2 | 6/2004 | Krieger et al. | |
| 10,021,841 B2 | 7/2018 | Andrews et al. | |
| 10,098,291 B2 | 10/2018 | Andrews et al. | |
| 11,326,867 B1 * | 5/2022 | Stewart | G01B 7/31 |
| 2007/0162209 A1 * | 7/2007 | Gallaun | A01G 25/092 239/731 |
| 2015/0060580 A1 * | 3/2015 | Welch | A01G 25/092 239/729 |
| 2017/0339851 A1 * | 11/2017 | Miller | F16H 9/04 |
| 2019/0059352 A1 * | 2/2019 | Miller | B05B 12/082 |
| 2020/0305366 A1 * | 10/2020 | Burkey | A01G 25/16 |

* cited by examiner

*Primary Examiner* — Gary Collins
(74) *Attorney, Agent, or Firm* — McGrath North Mullin & Kratz, PC LLO; Luke C. Holst (57) ABSTRACT

A tower control box for an intermediate tower of a center pivot irrigation system includes an overtravel shutoff switch configured to be toggled when the intermediate tower is out of alignment with a connected tower of the center pivot irrigation system beyond a misalignment threshold, wherein toggling the overtravel shutoff switch disconnects power to all wheel actuators of the center pivot irrigation system by opening a normally closed sub-switch for connecting the power and closing a normally open sub-switch for diverting the power. The tower control box may further include a misalignment indicator light and/or an externally accessible override switch connected to the overtravel shutoff switch to help identify and/or realign the intermediate tower with other towers of the center pivot irrigation system after the overtravel shutoff switch has been triggered.

17 Claims, 7 Drawing Sheets

TOWER CONTROL BOX WITH MISALIGNMENT INDICATOR LIGHT AND AUTOMATICALLY RESETTING OVERRIDE SWITCH

CROSS-REFERENCE TO RELATED APPLICATIONS

The present application claims the benefit under 35 U.S.C. § 119(e) of U.S. Provisional Application No. 63/212,783, filed Jun. 21, 2021, and titled "TOWER CONTROL BOX WITH MISALIGNMENT INDICATOR LIGHT AND AUTOMATICALLY RESETTING OVERRIDE SWITCH," which is incorporated herein by reference in its entirety.

TECHNICAL FIELD

The present disclosure generally relates to center pivot irrigation systems and, more particularly, to intermediate tower control boxes of center pivot irrigation systems.

BACKGROUND

While traveling about a pivot center, one tower of a center pivot irrigation system may become out of alignment with the other towers (e.g., because its wheels are jammed or stuck). Many systems include a misalignment shutoff switch that cuts power to all of the towers when one of the towers is misaligned beyond a certain threshold. However, the process of determining which tower is misaligned and correcting the misalignment typically requires a technician to guess which tower tripped the system, climb up the tower, and open the tower control box while power is returned to the system. Then, from within the tower control box, the technician must manually override the misalignment shutoff switch while the towers are reversed so that the towers can all be realigned. This may place the technician at risk of an injury from falling, electric shock, or getting snagged by moving parts. To reduce such risks, there is a need for systems that enable technicians to identify misaligned towers and correct misalignments more easily via external controls.

SUMMARY

An improved tower control box for an intermediate tower of a center pivot irrigation system is disclosed. The tower control box includes a shaft configured to turn clockwise or counterclockwise when the intermediate tower is out of alignment with a connected tower of the center pivot irrigation system. The shaft is coupled to a lever. The tower control box further includes a run switch configured to be toggled by the lever when the intermediate tower is out of alignment with the connected tower of the center pivot irrigation system, wherein toggling the run switch causes a wheel actuator to drive the intermediate tower in a forward or reverse direction to follow a direction of movement of the connected tower. The tower control box further includes an overtravel shutoff switch configured to be toggled by the lever when the intermediate tower is out of alignment with the connected tower of the center pivot irrigation system beyond a misalignment threshold, wherein toggling the overtravel shutoff switch disconnects power to all wheel actuators of the center pivot irrigation system by opening a normally closed sub-switch for connecting the power and closing a normally open sub-switch for diverting the power. The tower control box further includes a misalignment indicator light and/or an override switch.

In some embodiments, the misalignment indicator light is connected to the normally open sub-switch of the overtravel shutoff switch and configured to emit light when the normally open sub-switch is closed to indicate that the intermediate tower is out of alignment with the connected tower of the center pivot irrigation system beyond the misalignment threshold. Alternatively, the misalignment indicator light may be connected to the normally closed sub-switch of the overtravel shutoff switch and configured to cease to emit light when the normally closed sub-switch is open to indicate that the intermediate tower is out of alignment with the connected tower of the center pivot irrigation system beyond the misalignment threshold. In this manner, a misaligned tower can be readily identified without having to open the tower control box. Furthermore, the misaligned tower may be identified from a distance by viewing the emitted light (or lack of emitted light). For example, the misaligned tower may be identified from the ground without having to climb the tower.

In some embodiments, the override switch is connected to the normally open sub-switch and the normally closed sub-switch of the overtravel shutoff switch. The override switch is manually accessible to restore the power to the wheel actuators by redirecting the power from a previously connected terminal of the normally open sub-switch to a previously disconnected terminal of the normally closed sub-switch. In this manner, the previously diverted power is reconnected to power the wheel actuators so that the towers can be run again to bring the intermediate tower back into alignment. This is typically accomplished by reversing all the towers until the overtravel shutoff switch is toggled back to its initial state.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims.

DETAILED DESCRIPTION

Reference will now be made in detail to the subject matter disclosed, which is illustrated in the accompanying drawings.

Referring generally to FIGS. 1 through 7, an improved tower control box for an intermediate tower of a center pivot irrigation system is disclosed. In embodiments, the tower control box includes a misalignment indicator light and/or an override switch to assist with identification of misaligned towers and/or the process of realigning intermediate towers after an intermediate tower triggers a safety shutoff event as a result of the intermediate tower breaching a misalignment threshold.

Figure 1:
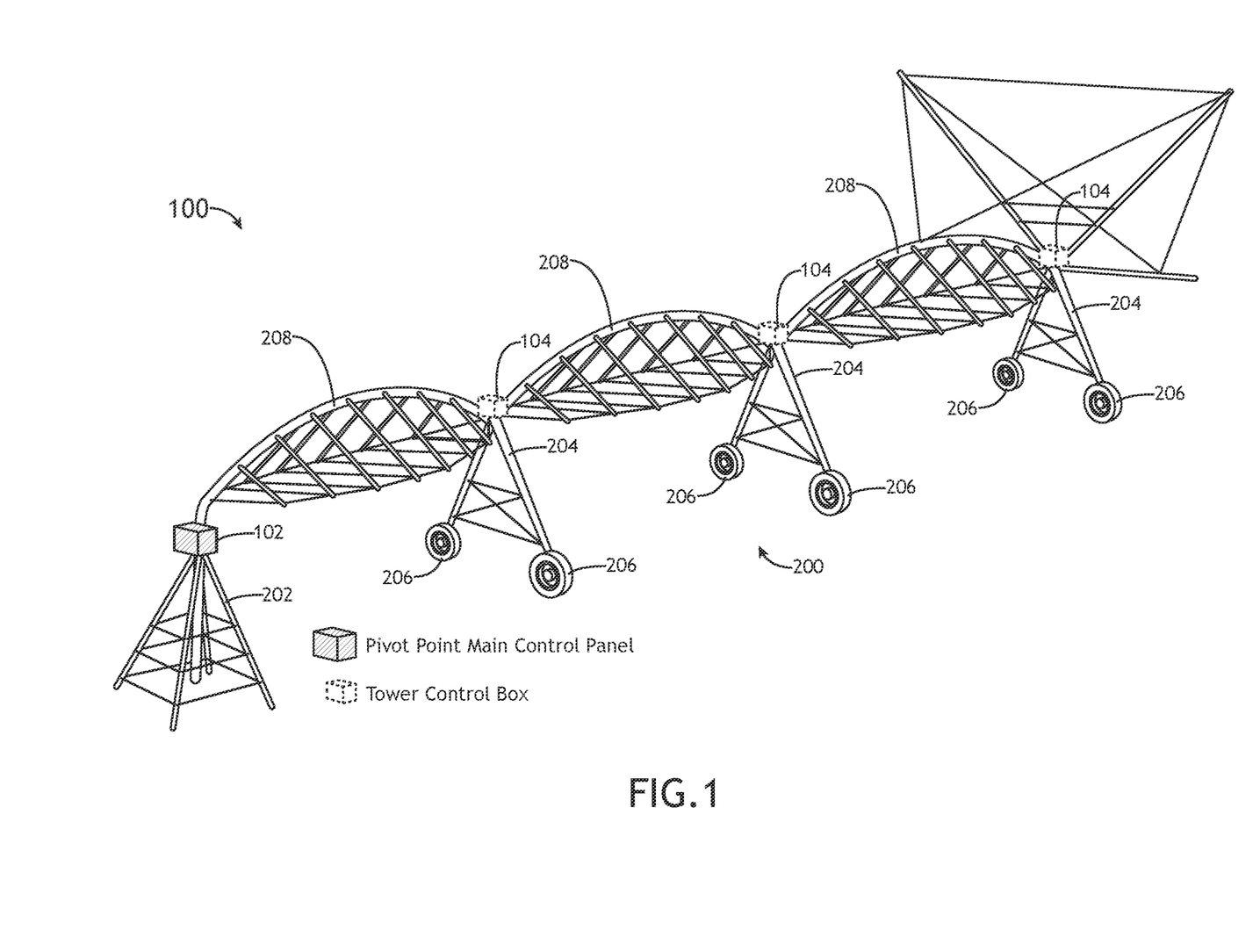
FIG. 1 is a schematic illustrating a perspective view of a center pivot irrigation system, in accordance with an example embodiment of this disclosure.

As shown in FIG. 1, a control system 100 for a center pivot irrigation system 200 includes a pivot point main control panel 102 at a pivot center 202 (e.g., central tower) of the center pivot irrigation system 200 and a plurality of tower control boxes 104 at other towers 204 (intermediate and end towers) of the center pivot irrigation system 102. The tower control boxes 104 may be communicatively coupled to the main control panel 102 by wires/cables running through or along spans 208 that structurally connect the towers 204 to one another and to the pivot center 202. In embodiments, the tower control boxes 104 are configured to control wheel actuators (e.g., motors) that drive the towers' wheels 206 forward or backward to move the towers clockwise or counterclockwise about the pivot center 202 while maintaining alignment between the towers.

FIGS. 2A through 2D illustrate a process for realigning the towers 204 when one of the intermediate towers 204 becomes out of alignment with respect to a neighboring (physically connected) tower 204 of the center pivot irrigation system 200 beyond a predefined misalignment threshold. Under normal operating conditions, the main control panel 102 sends a signal through the tower control boxes 104 that causes the tower control box at the end tower to run the wheel actuators in a forward or reverse direction at a specified speed. When the end tower moves, the tower control box of the neighboring tower will drive its wheel actuators to keep up, and so on. This results in a snaking action whereby each of the towers 204 moves to keep up with the next tower, and whereby all the intermediate towers follow the end tower in a clockwise or counterclockwise path about the pivot center 202.

Figure 2A:
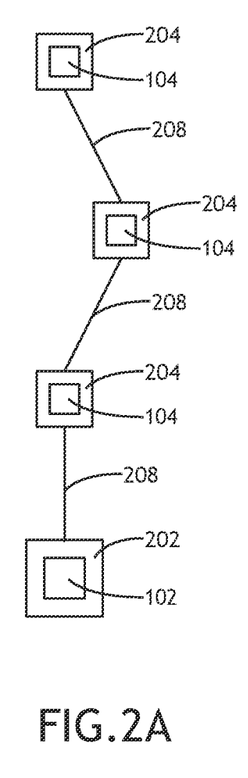
FIG. 2A is a schematic illustrating a top view of the center pivot irrigation system with a misaligned tower, in accordance with an example embodiment of this disclosure.
Figure 2B:
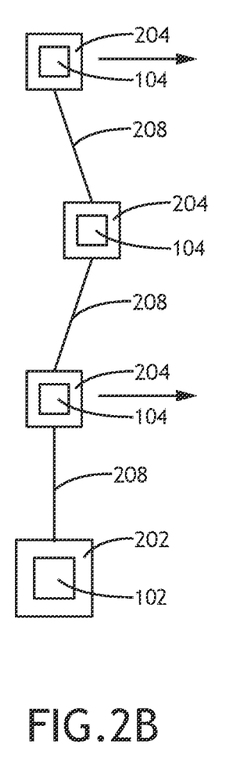
FIG. 2B is a schematic illustrating a top view of the center pivot irrigation system with a misaligned tower, wherein the center pivot irrigation system is being realigned by running other towers of the center pivot irrigation system in reverse, in accordance with an example embodiment of this disclosure.
Figure 2C:
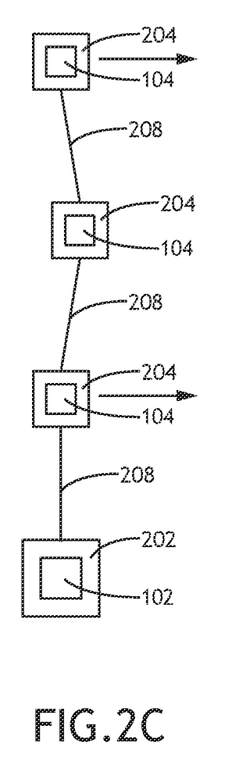
FIG. 2C is another schematic illustrating a top view of the center pivot irrigation system with a misaligned tower, wherein the center pivot irrigation system is being realigned by running other towers of the center pivot irrigation system in reverse, in accordance with an example embodiment of this disclosure.
Figure 2D:
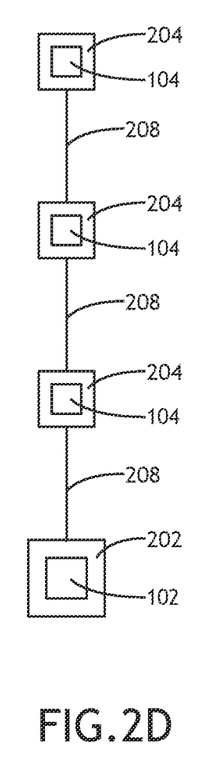
FIG. 2D is a schematic illustrating a top view of the center pivot irrigation system with all towers in alignment with one another, in accordance with an example embodiment of this disclosure.

If one of the towers 204 becomes out of alignment (e.g., because its wheels are jammed or stuck) beyond a certain misalignment threshold, the control system 100 is configured to suspend movement of all towers 204 by cutting power to the wheel actuators. For example, FIG. 2A is a schematic illustrating a top view of the center pivot irrigation system 200 with one of the towers 204 being out of alignment beyond the allowed misalignment threshold. FIGS. 2B and 2C illustrate a process that may be employed to realign the towers 204. Power must be reconnected to the wheel actuators so that the towers 204 can be run again to bring the misaligned tower back into alignment, which is typically accomplished by reversing all the towers 204 (e.g., as shown in FIGS. 2B and 2C) until the towers are realigned (e.g., as shown in FIG. 2D).

In existing systems, a tower control box may include a misalignment shutoff switch that cuts power to all of the wheel actuators (and possibly other components, e.g., pumps, sprayers, etc.) when one of the towers is misaligned beyond a certain threshold (often referred to herein as the "misalignment threshold"). However, in existing systems, the process of determining which tower is misaligned and correcting the misalignment typically requires a technician to guess which tower tripped the system, climb up the tower, and open the tower control box while power is returned to the system. Then, from within the tower control box, the technician must manually override the misalignment shutoff switch while the towers are reversed so that the towers can all be realigned. This may place the technician at risk of an injury from falling, electric shock, or getting snagged by moving parts. To reduce such risks, the tower control box 104 disclosed herein enables technicians to identify misaligned towers and correct misalignments more easily via external controls.

Embodiments of the tower control box 104 are described below with reference to FIGS. 3 through 7.

Figure 3:
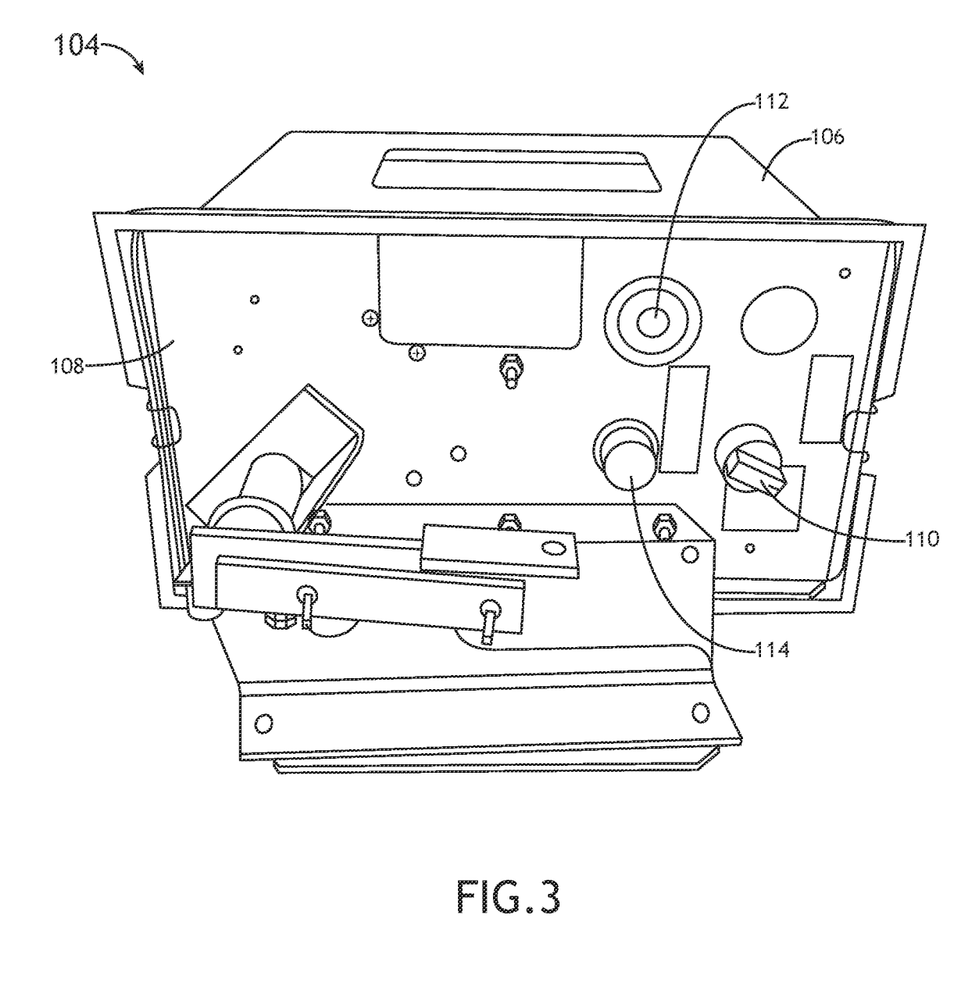
FIG. 3 is a bottom view of a tower control box of the center pivot irrigation system, in accordance with an example embodiment of this disclosure.
Figure 4:
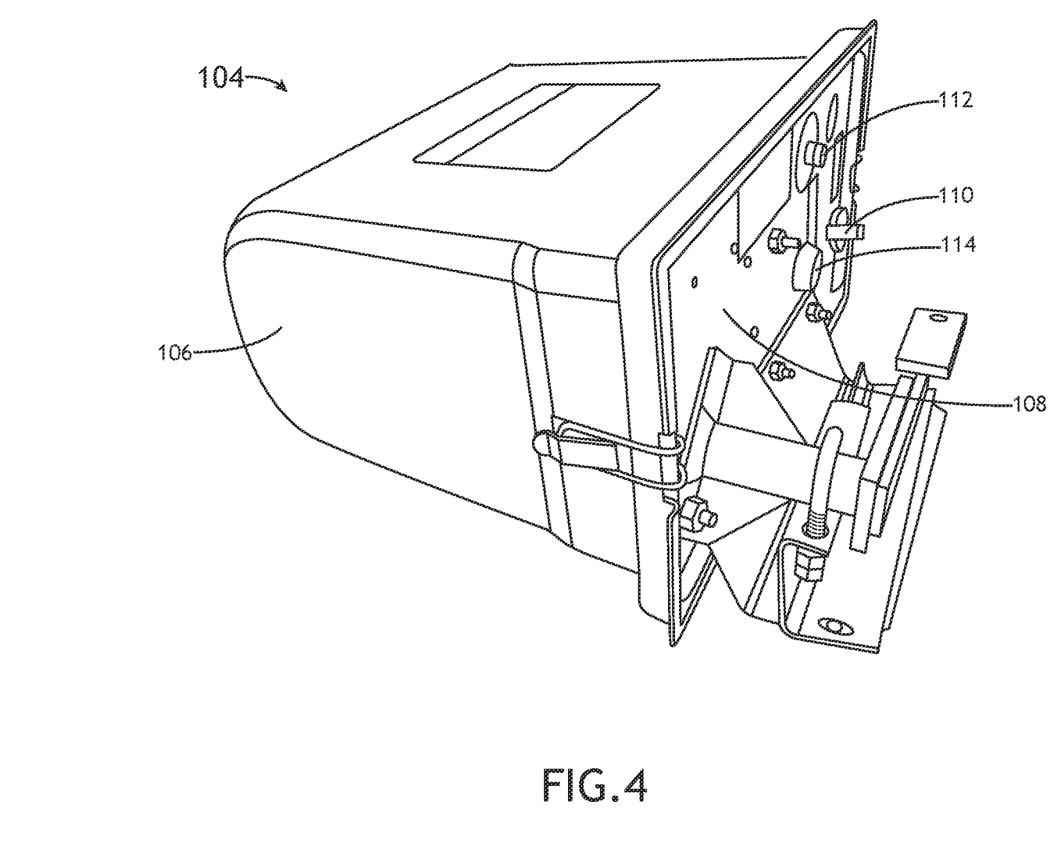
FIG. 4 is a perspective view of the tower control box, in accordance with an example embodiment of this disclosure.
Figure 5:
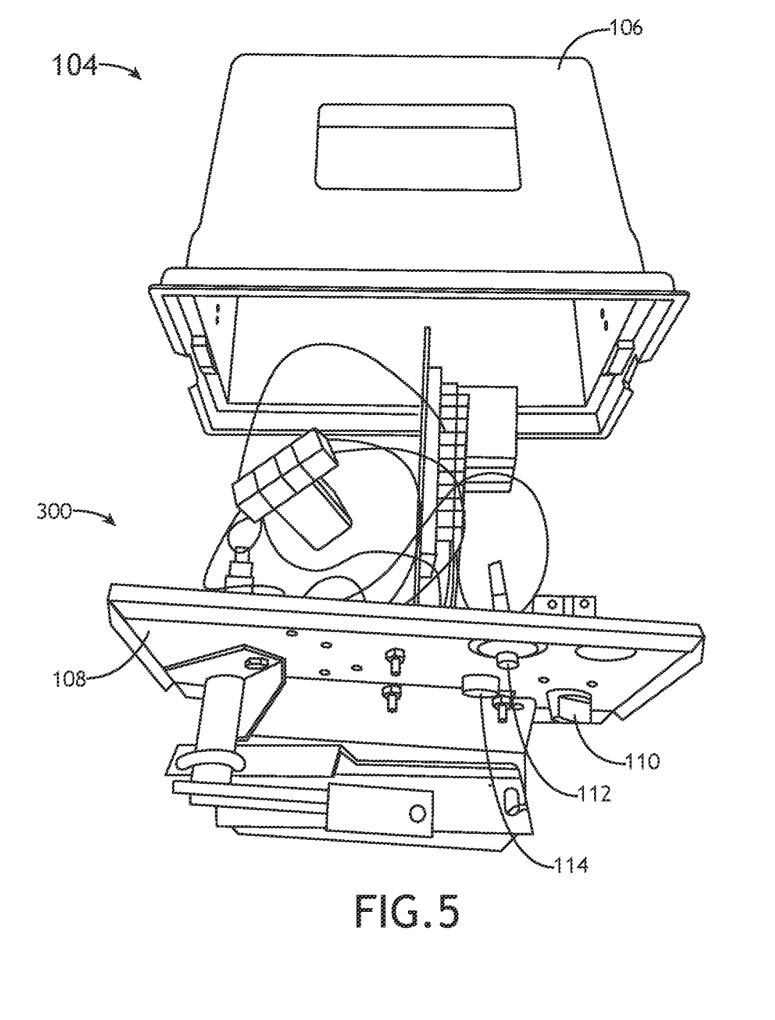
FIG. 5 is a front view of the tower control box, wherein an enclosure of the tower control box is being removed from a base panel of the tower control box to access internal components of the tower control box, in accordance with an example embodiment of this disclosure.

As shown in FIGS. 3 and 4, the tower control box 104 may include a base panel 108 configured to support electronic and mechanical components of the tower control box 104. For example, the base panel 108 may have a number of externally accessible components (e.g., on/off switch 110, misalignment indicator light 112, override button 114) mounted to the base panel 108 with at least a portion of each component being disposed upon an external surface of the base panel 108. For example, in embodiments, the misalignment indicator light 112 is at least partially disposed through an opening of the base panel 108 to emit light from the external surface of the base panel 108. By way of another example, in embodiments, the override button 114 (for toggling an override switch 316) is at least partially disposed through an opening of the base panel 108 to be manually accessed from the external surface of the base panel 108. The tower control box 104 may further include an enclosure 106 configured to be coupled to the base panel 108 to secure internal components 300 of the tower control box 104. As shown in FIG. 5, the enclosure 106 may be removed to access the internal components 300.

Figure 6:
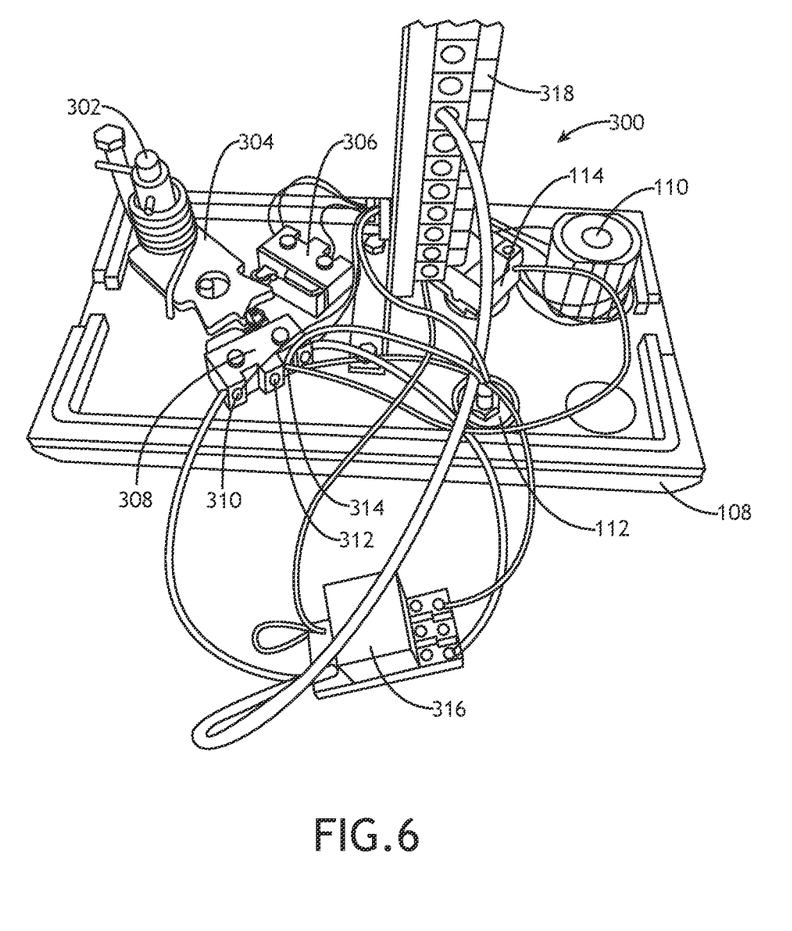
FIG. 6 is a perspective view of the base panel with the enclosure fully removed to show the internal components of the tower control box, in accordance with an example embodiment of this disclosure.

FIG. 6 illustrates the base panel 108 with the enclosure 106 fully removed to show the internal components 300 of the tower control box 104. As shown in FIG. 6, the tower control box 104 includes a shaft 302 configured to turn clockwise or counterclockwise when the intermediate tower is out of alignment with a connected tower (i.e., a neighboring tower) of the center pivot irrigation system 200. As used herein, the "intermediate tower" and "connected tower" may refer to any two adjacent towers 204 of the center pivot irrigation system 200. The shaft is coupled to a lever 304. The tower control box 104 further includes a run switch 306 configured to be toggled by the lever 304 when the intermediate tower is out of alignment with the connected tower of the center pivot irrigation system. Toggling the run switch 306 causes a wheel actuator to drive the intermediate tower in a forward or reverse direction to follow a direction of movement of the connected tower. In some embodiments, the run switch 306 may be configured to provide a forward motion signal when the run switch 306 is toggled in a first direction and a reverse motion signal when the run switch 306 is toggled in a second (opposite) direction, wherein the run switch 306 provides no signal when it is not being toggled in other direction.

Under normal operating conditions, the run switch 306 may be configured to keep the intermediate tower aligned with the connected tower by causing the wheel actuators of the intermediate tower to drive the intermediate tower in the direction of movement of the connected tower every time the connected tower moves and therefore becomes out of alignment with the intermediate tower. However, in some instance, the intermediate tower may become stuck or otherwise unable to keep up with the connected tower.

To prevent the intermediate tower from falling too far behind the connected tower and potentially causing damage to the system or to the field or creating an unsafe operating condition, the tower control box 104 further includes an overtravel shutoff switch 308 configured to be toggled by the lever 304 when the intermediate tower is out of alignment with the connected tower of the center pivot irrigation system 200 beyond a misalignment threshold (e.g., a predefined threshold for allowable misalignment between any two adjacent towers). When toggled from its initial state to a triggered state the overtravel shutoff switch 308 is configured to prevent further movement of the towers 204. In some embodiments, when it is toggled, the overtravel shutoff switch 308 is configured to disconnect power to all wheel actuators of the center pivot irrigation system 200 by opening a normally closed sub-switch (between terminals 310 and 314) for connecting the power to the wheel actuators (and possibly other system components) and closing a normally open sub-switch (between terminals 310 and 312) for diverting the power.

The tower control box 104 may include a misalignment indicator light 112 (e.g., a light-emitting diode (LED), incandescent/fluorescent lamp, or the like) and/or an override switch 316, in accordance with one or more embodiments of this disclosure. In FIGS. 3 through 6, the tower control box 104 is shown to include both the misalignment indicator light 112 and the override switch 316 (connected to override button 114); however, in some embodiments, the tower control box 104 may include one without the other and still be able to provide some of the advantages described herein.

In embodiments including the misalignment indicator light 112, the misalignment indicator light 112 may be connected to a terminal (e.g., terminal 312) of the normally open sub-switch (between terminals 310 and 312) of the overtravel shutoff switch 308. The misalignment indicator light 112 may also be connected to ground via a relay/connection panel 318 of the tower control box 104. The misalignment indicator light 112 may be configured to emit light when the normally open sub-switch (between terminals 310 and 312) is closed to indicate that the intermediate tower is out of alignment with the connected tower of the center pivot irrigation system 200 beyond the misalignment threshold. In this manner, a misaligned tower can be readily identified without having to open the tower control box 104. Furthermore, the misaligned tower may be identified from a distance by viewing the emitted light. For example, the misaligned tower may be identified from the ground without having to climb the tower.

In other embodiments including the misalignment indicator light 112, the misalignment indicator light 112 can be configured to emit light when the intermediate tower is within the misalignment threshold and cease to emit light when the intermediate tower breaches the misalignment threshold. In such embodiments, the misalignment indicator light 112 may be connected to a terminal (e.g., terminal 314) of the normally closed sub-switch (between terminals 310 and 314) of the overtravel shutoff switch 308. The misalignment indicator light 112 may also be connected to ground via a relay/connection panel 318 of the tower control box 104. The misalignment indicator light 112 may cease to emit light when the normally closed sub-switch (between terminals 310 and 314) is open to indicate that the intermediate tower is out of alignment with the connected tower of the center pivot irrigation system 200 beyond the misalignment threshold. In this manner, a misaligned tower can be readily identified without having to open the tower control box 104. Furthermore, the misaligned tower may be identified from a distance by seeing that light is no longer being emitted from the tower control box 104 of the affected tower.

In embodiments including the override switch 316 (and button 114), the override switch 316 is connected to the normally open sub-switch (between terminals 310 and 312) and the normally closed sub-switch (between terminals 310 and 314) of the overtravel shutoff switch 308. The override switch 316 is manually accessible (e.g., via override button 114) to restore the power to the wheel actuators by redirecting the power from a previously connected terminal (e.g., terminal 312) of the normally open sub-switch to a previously disconnected terminal (e.g., terminal 314) of the normally closed sub-switch. In this manner, the previously diverted power is reconnected to power the wheel actuators so that the towers 204 can be run again to bring the intermediate tower back into alignment. This is typically accomplished by reversing all the towers 204 until the overtravel shutoff switch 308 is toggled back to its initial state, wherein the normally closed sub-switch (between terminals 310 and 314) is closed again and the normally open sub-switch (between terminals 310 and 312) is open again.

In some embodiments, the override switch 316 is an automatically resetting override switch configured to reset and cease redirecting the power from the previously connected terminal (e.g., terminal 312) of the normally open sub-switch to the previously disconnected terminal (e.g., terminal 314) of the normally closed sub-switch when the overtravel shutoff switch 308 is toggled back to its initial state (i.e., after the intermediate tower is no longer out of alignment with the connected tower of the center pivot irrigation system 200 beyond the misalignment threshold). Toggling the overtravel shutoff switch 308 back to its initial state may reset the automatically resetting override switch as a result of disconnecting the power from the previously connected terminal (e.g., terminal 312) of the normally open sub-switch and reconnecting the power to the previously disconnected terminal (e.g., terminal 314) of the normally closed sub-switch to restore power. In some embodiments, the automatically resetting override switch 316 is connected to the overtravel shutoff switch 308 in a manner that causes the override switch 316 to reset upon restoring power to terminal 314 and/or removing power from terminal 312, whereby the system resumes normal operation. This allows for the towers 204 to be realigned and normal system operation to be restored all without having to open the tower control box 104, thereby improving safety conditions for technicians conducting system troubleshooting and realignment procedures.

Figure 7:
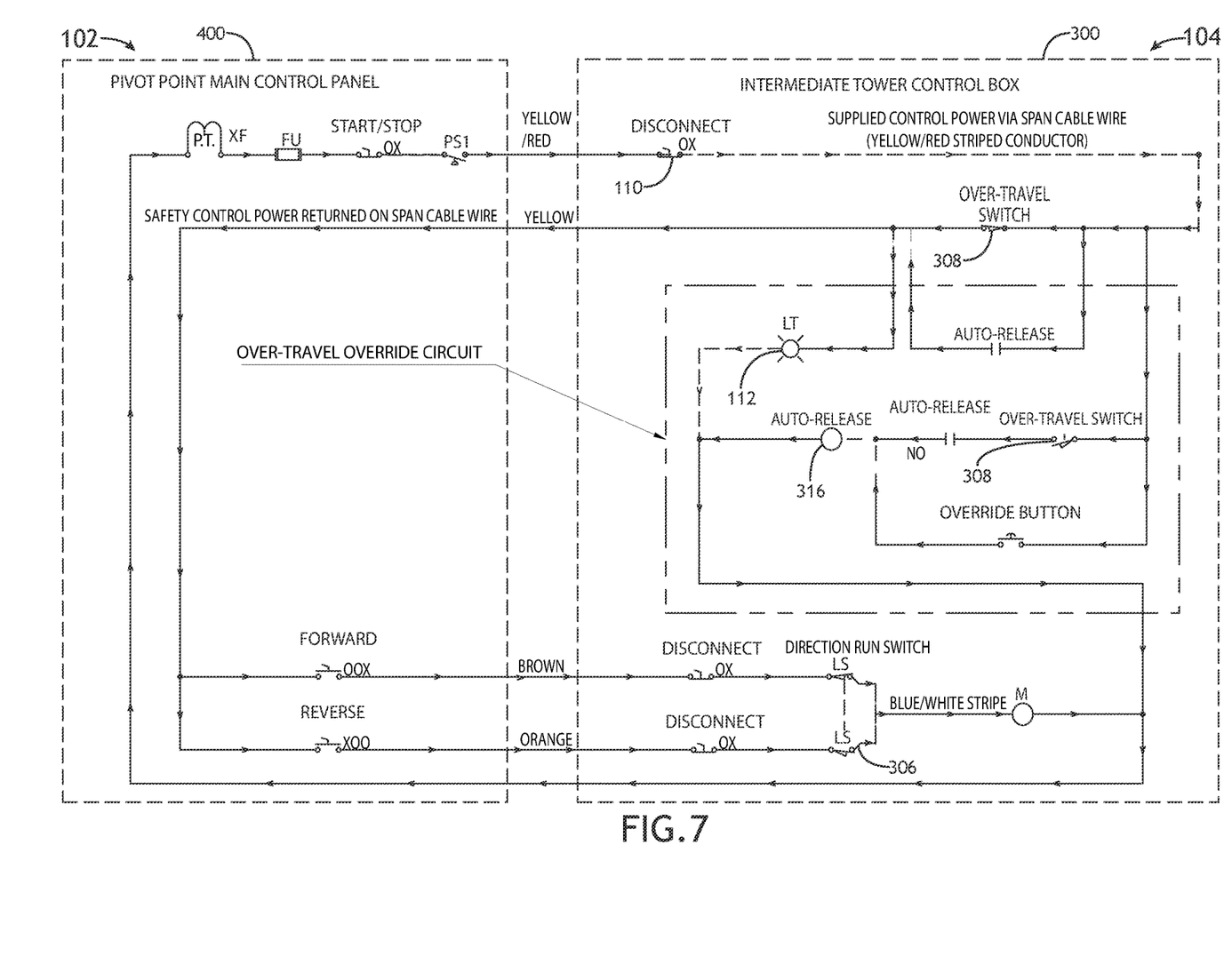
FIG. 7 is a schematic showing connectivity between the realignment circuit of the tower control box and a pivot point control panel of the center pivot irrigation system, in accordance with an example embodiment of this disclosure.

FIG. 7 is a circuit schematic showing connectivity between the realignment circuit/components 300 (including the misalignment indicator light 112 and/or override switch 316) of the tower control box 104 and a tower control circuit 400 of the pivot point main control panel 102 of the control system 100 for the center pivot irrigation system 200, in accordance with an example embodiment of this disclosure.

Although the technology has been described with reference to the embodiments illustrated in the attached drawing figures, equivalents may be employed, and substitutions may be made herein without departing from the scope of the technology as recited in the claims. Components illustrated and described herein are examples of devices and components that may be used to implement the embodiments of the present invention and may be replaced with other devices and components without departing from the scope of the invention. Furthermore, any dimensions, degrees, and/or numerical ranges provided herein are to be understood as non-limiting examples unless otherwise specified in the claims.

What is claimed is:

1. A tower control box for an intermediate tower of a center pivot irrigation system, comprising:
    a shaft configured to turn clockwise or counterclockwise when the intermediate tower is out of alignment with a connected tower of the center pivot irrigation system;
    a lever coupled to the shaft;
    a run switch configured to be toggled by the lever when the intermediate tower is out of alignment with the connected tower of the center pivot irrigation system, wherein toggling the run switch causes a wheel actuator to drive the intermediate tower in a forward or reverse direction to follow a direction of movement of the connected tower;
    an overtravel shutoff switch configured to be toggled by the lever when the intermediate tower is out of alignment with the connected tower of the center pivot irrigation system beyond a misalignment threshold, wherein toggling the overtravel shutoff switch disconnects power to all wheel actuators of the center pivot irrigation system by opening a normally closed sub-switch for connecting the power and closing a normally open sub-switch for diverting the power; and
    a misalignment indicator light, wherein the misalignment indicator light is either: (i) connected to the normally open sub-switch of the overtravel shutoff switch and configured to emit light when the normally open sub-switch is closed to indicate that the intermediate tower is out of alignment with the connected tower of the center pivot irrigation system beyond the misalignment threshold; or (ii) connected to the normally closed sub-switch of the overtravel shutoff switch and configured to cease to emit light when the normally closed sub-switch is open to indicate that the intermediate tower is out of alignment with the connected tower of the center pivot irrigation system beyond the misalignment threshold.

2. The tower control box of claim 1, further comprising:
    an override switch connected to the normally open sub-switch and the normally closed sub-switch of the overtravel shutoff switch, the override switch being manually accessible to restore the power to the wheel actuators by redirecting the power from a previously connected terminal of the normally open sub-switch to a previously disconnected terminal of the normally closed sub-switch.

3. The tower control box of claim 2, wherein the override switch comprises an automatically resetting override switch configured to reset and cease redirecting the power from the previously connected terminal of the normally open sub-switch to the previously disconnected terminal of the normally closed sub-switch when the overtravel shutoff switch is toggled back to an initial state after the intermediate tower is no longer out of alignment with the connected tower of the center pivot irrigation system beyond the misalignment threshold, wherein toggling the overtravel shutoff switch back to the initial state resets the automatically resetting override switch as a result of disconnecting the power from the previously connected terminal of the normally open sub-switch and reconnecting the power to the previously disconnected terminal of the normally closed sub-switch.

4. The tower control box of claim 2, further comprising:
    a base panel, wherein the shaft, the lever, the run switch, the overtravel shutoff switch, the misalignment indicator light, and the override switch are all mounted to the base panel; and
    an enclosure configured to be coupled to the base panel.

5. The tower control box of claim 4, wherein the misalignment indicator light is at least partially disposed through an opening of the base panel to emit light from an external surface of the base panel.

6. The tower control box of claim 4, wherein the override switch is coupled to a button that is at least partially disposed through an opening of the base panel to be manually accessed from an external surface of the base panel.

7. A tower control box for an intermediate tower of a center pivot irrigation system, comprising:
    a shaft configured to turn clockwise or counterclockwise when the intermediate tower is out of alignment with a connected tower of the center pivot irrigation system;
    a lever coupled to the shaft;
    a run switch configured to be toggled by the lever when the intermediate tower is out of alignment with the connected tower of the center pivot irrigation system, wherein toggling the run switch causes a wheel actuator to drive the intermediate tower in a forward or reverse direction to follow a direction of movement of the connected tower;
    an overtravel shutoff switch configured to be toggled by the lever when the intermediate tower is out of alignment with the connected tower of the center pivot irrigation system beyond a misalignment threshold, wherein toggling the overtravel shutoff switch disconnects power to all wheel actuators of the center pivot irrigation system by opening a normally closed sub-switch for connecting the power and closing a normally open sub-switch for diverting the power; and
    an override switch connected to the normally open sub-switch and the normally closed sub-switch of the overtravel shutoff switch, the override switch being manually accessible to restore the power to the wheel actuators by redirecting the power from a previously connected terminal of the normally open sub-switch to a previously disconnected terminal of the normally closed sub-switch.

8. The tower control box of claim 7, wherein the override switch comprises an automatically resetting override switch configured to reset and cease redirecting the power from the previously connected terminal of the normally open sub-switch to the previously disconnected terminal of the normally closed sub-switch when the overtravel shutoff switch is toggled back to an initial state after the intermediate tower is no longer out of alignment with the connected tower of the center pivot irrigation system beyond the misalignment threshold, wherein toggling the overtravel shutoff switch back to the initial state resets the automatically resetting override switch as a result of disconnecting the power from the previously connected terminal of the normally open sub-switch and reconnecting the power to the previously disconnected terminal of the normally closed sub-switch.

9. The tower control box of claim 7, further comprising:
a misalignment indicator light connected to the normally open sub-switch of the overtravel shutoff switch and configured to emit light when the normally open sub-switch is closed to indicate that the intermediate tower is out of alignment with the connected tower of the center pivot irrigation system beyond the misalignment threshold; or
a misalignment indicator light connected to the normally closed sub-switch of the overtravel shutoff switch and configured to cease to emit light when the normally closed sub-switch is open to indicate that the intermediate tower is out of alignment with the connected tower of the center pivot irrigation system beyond the misalignment threshold.

10. The tower control box of claim 9, further comprising:
a base panel, wherein the shaft, the lever, the run switch, the overtravel shutoff switch, the misalignment indicator light, and the override switch are all mounted to the base panel; and
an enclosure configured to be coupled to the base panel.

11. The tower control box of claim 10, wherein the misalignment indicator light is at least partially disposed through an opening of the base panel to emit light from an external surface of the base panel.

12. The tower control box of claim 10, wherein the override switch is coupled to a button that is at least partially disposed through an opening of the base panel to be manually accessed from an external surface of the base panel.

13. A tower control box for an intermediate tower of a center pivot irrigation system, comprising:
a shaft configured to turn clockwise or counterclockwise when the intermediate tower is out of alignment with a connected tower of the center pivot irrigation system;
a lever coupled to the shaft;
a run switch configured to be toggled by the lever when the intermediate tower is out of alignment with the connected tower of the center pivot irrigation system, wherein toggling the run switch causes a wheel actuator to drive the intermediate tower in a forward or reverse direction to follow a direction of movement of the connected tower;
an overtravel shutoff switch configured to be toggled by the lever when the intermediate tower is out of alignment with the connected tower of the center pivot irrigation system beyond a misalignment threshold, wherein toggling the overtravel shutoff switch disconnects power to all wheel actuators of the center pivot irrigation system by opening a normally closed sub-switch for connecting the power and closing a normally open sub-switch for diverting the power;
a misalignment indicator light, wherein the misalignment indicator light is either: (i) connected to the normally open sub-switch of the overtravel shutoff switch and configured to emit light when the normally open sub-switch is closed to indicate that the intermediate tower is out of alignment with the connected tower of the center pivot irrigation system beyond the misalignment threshold; or (ii) connected to the normally closed sub-switch of the overtravel shutoff switch and configured to cease to emit light when the normally closed sub-switch is open to indicate that the intermediate tower is out of alignment with the connected tower of the center pivot irrigation system beyond the misalignment threshold; and
an override switch connected to the normally open sub-switch and the normally closed sub-switch of the overtravel shutoff switch, the override switch being manually accessible to restore the power to the wheel actuators by redirecting the power from a previously connected terminal of the normally open sub-switch to a previously disconnected terminal of the normally closed sub-switch.

14. The tower control box of claim 13, wherein the override switch comprises an automatically resetting override switch configured to reset and cease redirecting the power from the previously connected terminal of the normally open sub-switch to the previously disconnected terminal of the normally closed sub-switch when the overtravel shutoff switch is toggled back to an initial state after the intermediate tower is no longer out of alignment with the connected tower of the center pivot irrigation system beyond the misalignment threshold, wherein toggling the overtravel shutoff switch back to the initial state resets the automatically resetting override switch as a result of disconnecting the power from the previously connected terminal of the normally open sub-switch and reconnecting the power to the previously disconnected terminal of the normally closed sub-switch.

15. The tower control box of claim 13, further comprising:
a base panel, wherein the shaft, the lever, the run switch, the overtravel shutoff switch, the misalignment indicator light, and the override switch are all mounted to the base panel; and
an enclosure configured to be coupled to the base panel.

16. The tower control box of claim 15, wherein the misalignment indicator light is at least partially disposed through an opening of the base panel to emit light from an external surface of the base panel.

17. The tower control box of claim 15, wherein the override switch is coupled to a button that is at least partially disposed through an opening of the base panel to be manually accessed from an external surface of the base panel.

* * * * *